United States Patent
Geller et al.

(10) Patent No.: US 10,562,369 B2
(45) Date of Patent: Feb. 18, 2020

(54) EFFICIENT HVAC OPERATION BY PREDICTIVE CONTROL

(71) Applicant: Toyota Motor Engineering & Manufacturing North America, Inc., Erlanger, KY (US)

(72) Inventors: Benjamin M. Geller, Ann Arbor, MI (US); Joshua D. Payne, Ann Arbor, MI (US); Shannon Alicia Wrobel, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 186 days.

(21) Appl. No.: 15/596,965

(22) Filed: May 16, 2017

(65) Prior Publication Data

US 2018/0334012 A1    Nov. 22, 2018

(51) Int. Cl.
*B60H 1/00* (2006.01)
*B60H 1/32* (2006.01)

(52) U.S. Cl.
CPC ..... *B60H 1/00764* (2013.01); *B60H 1/00392* (2013.01); *B60H 1/00428* (2013.01); *B60H 1/3208* (2013.01); *B60H 2001/3266* (2013.01); *B60H 2001/3273* (2013.01)

(58) Field of Classification Search
None
See application file for complete search history.

(56) References Cited

U.S. PATENT DOCUMENTS

| | | | |
|---|---|---|---|
| 6,336,335 B2 | 1/2002 | Ota et al. | |
| 6,463,749 B2 | 10/2002 | Niimi | |
| 6,755,032 B1 | 6/2004 | Kotwicki et al. | |
| 6,840,055 B2 | 1/2005 | Iritani | |
| 6,981,544 B2 | 1/2006 | Iwanami et al. | |
| 7,788,027 B2 | 8/2010 | Jones | |
| 7,835,835 B2 | 11/2010 | Wakiyama et al. | |
| 8,948,964 B2 | 2/2015 | Pan | |
| 2004/0031277 A1* | 2/2004 | Hirose | B60H 1/3205 62/186 |

(Continued)

FOREIGN PATENT DOCUMENTS

| EP | 2648936 | 12/2010 |
|---|---|---|
| JP | 2005119387 | 5/2005 |

*Primary Examiner* — Marc E Norman
*Assistant Examiner* — Schyler S Sanks
(74) *Attorney, Agent, or Firm* — Snell & Wilmer LLP (57) ABSTRACT

A system includes a power source, a sensor to detect data, and a HVAC system having a compressor to compress vapor refrigerant and a fan to blow conditioned air into a cabin of the vehicle, the compressor and the fan both designed to operate using a portion of the power generated by the power source. The system further includes an ECU to predict that the vehicle will accelerate or decelerate based on the data, to decrease power provided to the compressor and increase power provided to the fan when the ECU predicts the acceleration in order to reduce total power provided to the HVAC system and to reduce variance in total noise and vibration generated by the HVAC system, and to increase power to the compressor when the ECU predicts that the vehicle will decelerate in order to increase the total power provided to the HVAC system.

20 Claims, 5 Drawing Sheets

(56) References Cited

U.S. PATENT DOCUMENTS

| | | | |
|---|---|---|---|
| 2006/0259219 A1* | 11/2006 | Wakiyama | B60H 1/005 |
| | | | 701/36 |
| 2009/0133417 A1* | 5/2009 | Egawa | B60H 1/00735 |
| | | | 62/132 |
| 2012/0222438 A1 | 9/2012 | Osaka et al. | |
| 2014/0180607 A1 | 6/2014 | Bona et al. | |
| 2015/0183293 A1 | 7/2015 | Kim | |
| 2015/0202943 A1* | 7/2015 | Giraud | B60H 1/00428 |
| | | | 62/243 |
| 2015/0246593 A1* | 9/2015 | Larson | B60H 1/00014 |
| | | | 62/56 |
| 2016/0236540 A1 | 8/2016 | Ikeda et al. | |

* cited by examiner

| PREDICTED ACCELERATION TIME | PREDICTED POWER DURING ACCELERATION | CURRENT HVAC CONSUMPTION | ENGINE POWER OUTPUT AT OPTIMAL SETTING | BATTERY OUTPUT FOR DURATION OF PREDICTED ACCELERATION TIME | ADJUSTMENT TO HVAC POWER |
|---|---|---|---|---|---|
| 60 SECONDS | 15 KW | 3 KW | 10 KW | 10 KW | 0 KW |
| 60 SECONDS | 20 KW | 4 KW | 10 KW | 12 KW | -2 KW |
| 60 SECONDS | -5 KW | 3 KW | 0 KW | 0 KW | +2 KW |

FIG. 4

EFFICIENT HVAC OPERATION BY PREDICTIVE CONTROL

BACKGROUND

1. Field

The present disclosure relates to systems and methods for adjusting an amount of power provided to a heating, ventilation, and air conditioning (HVAC) system based on a predicted acceleration or deceleration of the vehicle.

2. Description of the Related Art

Electronic control systems for vehicles have been increasing in quantity and improving in quality for years. Such control systems may take actions to increase efficiency of the vehicles for various reasons, such as to save fuel cost for the driver, reduce emissions, and the like. Some of these control systems may learn driver behaviors and may control various features of the vehicle based on the learned driver behaviors. For example, a control system may learn when a vehicle will accelerate or decelerate, may learn rates of acceleration or deceleration, and the like.

Based on the predicted acceleration or deceleration a vehicle may take certain actions to increase vehicle efficiency. For example, most engines operate at peak efficiency when operating at an optimal engine speed and torque. Based on this knowledge, a control system of a vehicle may increase or decrease a state of charge of a battery in preparation of an upcoming acceleration or deceleration in order to allow the engine to operate at the optimal engine speed and torque during the acceleration or deceleration. However, there are times when increasing or decreasing the state of charge of the battery is insufficient to allow the engine to operate at the optimal engine speed and torque.

Thus, there is a need for systems and methods for further improving vehicle efficiency based on predicted accelerations and decelerations.

SUMMARY

Described herein is a system for adjusting a vehicle climate control based on a predicted action of a vehicle. The system includes a power source designed to generate power to propel the vehicle. The system also includes a sensor designed to detect data that is usable to predict an upcoming acceleration or deceleration of the vehicle. The system also includes a heating, ventilation, and air conditioning (HVAC) system having a compressor designed to compress vapor refrigerant and a fan designed to blow conditioned air into a cabin of the vehicle, the compressor and the fan both designed to operate using a portion of the power generated by the power source. The system further includes an electronic control unit (ECU) coupled to the power source, the sensor, and the HVAC system. The ECU is designed to predict that the vehicle will accelerate or decelerate within a predetermined distance or a predetermined amount of time based on the data detected by the sensor. The ECU is further designed to decrease the power that is provided to the compressor and increase the power that is provided to the fan when the ECU predicts that the vehicle will accelerate within the predetermined distance or the predetermined amount of time in order to reduce total power provided to the HVAC system and to reduce variance in total noise and vibration generated by the HVAC system. The ECU is further designed to increase the power that is provided to the compressor when the ECU predicts that the vehicle will decelerate within the predetermined distance or the predetermined amount of time in order to increase the total power provided to the HVAC system.

Also described is a system for adjusting a vehicle climate control based on a predicted action of a vehicle. The system includes a power source configured to generate power to propel the vehicle. The system also includes a sensor configured to detect data that is usable to predict an upcoming acceleration or deceleration of the vehicle. The system also includes a heating, ventilation, and air conditioning (HVAC) system having a component that utilizes some of the power generated by the power source to increase or decrease a temperature of a cabin of the vehicle. The system also includes an electronic control unit (ECU) coupled to the power source, the sensor, and the HVAC system. The ECU is designed to predict that the vehicle will accelerate or decelerate within a predetermined distance or a predetermined amount of time based on the data detected by the sensor and to decrease the power that is provided to the HVAC system when the ECU predicts that the vehicle will accelerate within the predetermined distance or the predetermined amount of time in order to increase efficiency of the power source. The ECU is also designed to increase the power that is provided to the HVAC system when the ECU predicts that the vehicle will decelerate within the predetermined distance or the predetermined amount of time in order to increase efficiency of the power source.

Also described is a method for adjusting a vehicle climate control based on a predicted action of a vehicle. The method includes generating, by a power source, power to propel the vehicle. The method further includes detecting, by a sensor, data that is usable to predict an upcoming acceleration or deceleration of the vehicle. The method further includes predicting, by an electronic control unit (ECU), that the vehicle will accelerate or decelerate within a predetermined distance or a predetermined amount of time based on the data detected by the sensor. The method further includes decreasing, by the ECU, the power that is provided to a compressor of a heating, ventilation, and air conditioning (HVAC) system and increasing, by the ECU, the power that is provided to a fan of the HVAC system when the ECU predicts that the vehicle will accelerate within the predetermined distance or the predetermined amount of time in order to reduce total power provided to the HVAC system and to reduce variance in total noise and vibration generated by the HVAC system. The method further includes increasing, by the ECU, the power that is provided to the compressor of the HVAC system and decreasing, by the ECU, the power that is provided to the fan of the HVAC system when the ECU predicts that the vehicle will decelerate within the predetermined distance or the predetermined amount of time in order to increase the total power provided to the HVAC system and to reduce the variance in total noise and vibration generated by the HVAC system.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling power to a heating, ventilation, and air conditioning (HVAC) system based on predicted accelerations and decelerations of a vehicle. An exemplary system includes a power source, such as one or more of an engine or a motor-generator. The system further includes one or more sensors capable of detecting data that is usable to predict an upcoming acceleration or deceleration. The system further includes a HVAC system that includes a compressor and a fan. The system also includes an electronic control unit (ECU) that can predict whether the vehicle will accelerate or decelerate based on the detected data and that can increase or decrease an amount of power provided to the HVAC system based on the predicted acceleration or deceleration. For example, the ECU may decrease total power provided to the HVAC system to allow more power to be provided for propelling the vehicle in preparation of an upcoming acceleration. The ECU may also increase total power provided to the HVAC system to utilize regenerated power during an upcoming deceleration.

The systems and methods provide various benefits and advantages such as improving vehicle efficiency and durability of vehicle components. Because the system allows for a change in the total power consumption of vehicle accessories, the vehicle can more efficiently prepare for an upcoming acceleration or deceleration. For example, the vehicle may reduce power provided to the HVAC system in order to allow an engine to power through the acceleration at an optimally efficient torque and engine speed.

When the total power provided to the HVAC system is reduced, power provided to the compressor may be reduced and power provided to the fan may be increased. This provides the advantage of decreasing total power consumption while simultaneously reducing a total variation in noise and vibration generated by the HVAC system. This is beneficial because variations in noise and vibration are undesirable to drivers and passengers. The change in amount of power provided to the HVAC system may be adjusted based on factors such as a climate control setting and an ambient temperature, thus advantageously providing increased comfort to the driver and passengers.

Figure 1:
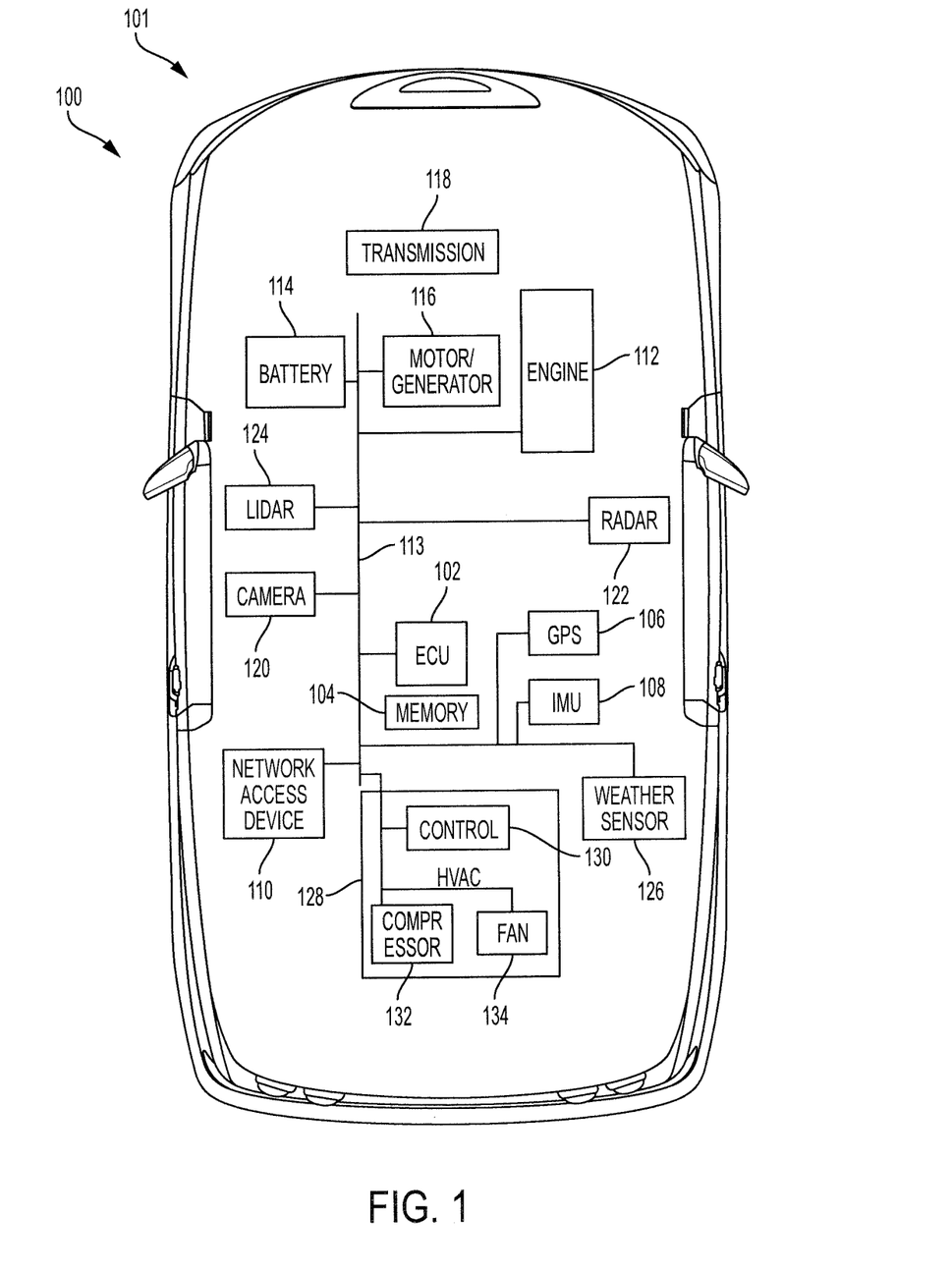
FIG. 1 is a block diagram of a vehicle having a HVAC system and an ECU designed to adjust the HVAC system in order to increase vehicle efficiency based on predicted accelerations and decelerations according to an embodiment of the present invention.

Turning to FIG. 1, a vehicle 100 includes components of a system 101 for improving efficiency of the vehicle 100. The vehicle 100 includes an electronic control unit (ECU) 102, a memory 104, a global positioning system (GPS) sensor 106, an inertial measurement unit (IMU) sensor 108, and a network access device 110. The vehicle 100 further includes a power source which may include one or more of an engine 112 or a combination of a battery 114 and motor-generator 116. The vehicle 100 may further include a power bus 113 coupled to the power source and configured to transfer power between the power source and other components of the vehicle 100.

The vehicle 100 may further include a transmission 118 for applying mechanical power from the engine 112 or the motor-generator 116 to wheels to propel the vehicle 100. The vehicle 100 further includes one or more sensors including a camera 120, a radio detection and ranging (radar) sensor 122, a light imaging, detection, and ranging (LIDAR) sensor 124, and a weather sensor 126.

The vehicle 100 may further include a climate control system which may include a HVAC system 128. The HVAC system 128 may include a control interface 130, a compressor 132, and a fan 134.

The ECU 102 may be coupled to each of the components of the vehicle 100 and may include one or more processors or controllers, which may be specifically designed for automotive systems. The functions of the ECU 102 can be implemented in a single ECU or in multiple ECUs. The ECU 102 may receive data from components of the vehicle 100, may make determinations based on the received data, and may control the operations of components based on the determinations.

The memory 104 may include any non-transitory memory known in the art. In that regard, the memory 104 may store machine-readable instructions usable by the ECU 102 and may store other data as requested by the ECU 102.

The GPS sensor 106 may be capable of detecting location data corresponding to a location of the vehicle 100. The IMU sensor 108 may detect a velocity or an orientation of the vehicle 100. One or both of the GPS sensor 106 or the IMU sensor 108 may be referred to as a location sensor and may be used to determine a current location, heading, and/or orientation of the vehicle 100.

The network access device 110 may include any port or device capable of communicating via a wired or wireless interface such as Wi-Fi, Bluetooth, a cellular protocol, vehicle to vehicle communications, or the like. For example, the ECU 102 may control the network access device 110 to communicate with the cloud, an external vehicle, or any other object or device. For example, the network access device 110 may retrieve traffic or weather information from the cloud. As another example, the network access device 110 may retrieve data from nearby vehicles such as a speed of the vehicles, a quantity of the vehicles, a location of the vehicles, or the like.

The engine 112 may convert a fuel into mechanical power. In that regard, the engine 112 may be a gasoline engine, a diesel engine, a fuel cell engine, or the like.

The battery 114 may store electrical energy. The motor-generator 116 may convert the electrical energy stored in the battery into mechanical power usable by the transmission 118. The motor-generator 116 may further convert mechanical power received from the transmission 118 to electrical power, which may be stored in the battery 114 as energy and/or used by other components of the vehicle 100.

The transmission 118 may be coupled to the engine 112 and the motor-generator 116. The transmission 118 may include a power splitter and may transfer mechanical power received from one or both of the engine 112 and the motor-generator 116 to wheels of the vehicle 100. The transmission 118 may control how much mechanical power is transferred from each of the engine 112 and the motor-generator 116. For example, the ECU 102 may control the transmission 118 to achieve a desired power transfer from each of the engine 112 and the motor-generator 116. The transmission 118 may further transfer mechanical energy received from one or both of the engine 112 or wheels of the vehicle 100 to the motor-generator 116 for conversion into electrical power.

The camera 120 may include one or more camera oriented in such a manner as to be able to detect image data corresponding to an environment of the vehicle 100. For example, the camera 120 may include a camera positioned on each end of the vehicle 100 to detect the presence of objects in the environment of the vehicle 100.

The radar sensor 122 may include one or more radar device oriented in such a manner as to be able to detect radar data corresponding to an environment of the vehicle 100. For example, the radar sensor 122 may transmit a radar beam, receive a reflection of the radar beam, and analyze the reflection of the radar beam to determine the presence and characteristics of objects in the environment of the vehicle 100.

The LIDAR sensor 124 may include one or more LIDAR device oriented in such a manner as to be able to detect LIDAR data corresponding to an environment of the vehicle 100. For example, the LIDAR sensor 124 may transmit light, receive a reflection of the light, and analyze the reflection of the light to determine the presence and characteristics of objects in the environment of the vehicle 100. Inclusion of the camera 120, the radar sensor 122, and the LIDAR sensor 124 may be advantageous as the camera 120 may be best suited to detect data in some environmental conditions, the radar sensor 122 may be best suited to detect data in other environmental conditions, and the LIDAR sensor 124 may be best suited to detect data in yet other environmental conditions.

The weather sensor 126 may include any sensor capable of detecting data corresponding to weather conditions inside a vehicle cabin or outside of the vehicle 100. For example, the weather sensor 126 may detect an ambient temperature within the vehicle cabin, an amount of ambient light outside of the vehicle 100, an ambient temperature of the environment outside of the vehicle 100, moisture in the environment inside or outside of the vehicle 100, the presence of clouds, or the like.

The HVAC system 128 is used to control conditions within the vehicle cabin. In particular, a driver or passenger of the vehicle 100 may control operation of the HVAC system 128 using the control interface 130. For example, a user may use the control interface 130 to select a desired cabin temperature, a desired fan speed, or the like. The compressor 132 compresses refrigerant in a vapor or gaseous form into a liquid form. In some embodiments, the refrigerant may instead or additionally include other compounds having a gaseous and/or a liquid phase, such as carbon dioxide ($CO_2$). The liquid refrigerant may then run through one or more coil, collecting heat from air outside of the coil thus cooling the air outside of the coil. The fan 134 draws warm air into the HVAC system 128 where it passes by the coils and cools off. The fan 134 then blows the cool air into the vehicle cabin.

Some HVAC systems may include components other than a compressor, such as a thermoelectric device which may include a resistive element (such as a wire) or other means of providing heating and cooling. In that regard, this disclosure is equally applicable to HVAC systems that utilize refrigerants, systems that utilize fluids other than refrigerants, systems that include additional or alternative heating or cooling technology, or the like.

The HVAC system 128 may further be used to heat the vehicle cabin. For example, the heated refrigerant may pass through a heater core which in turn heats air in the environment. The fan 134 may then blow the heated air into the vehicle cabin.

In order to control the vehicle 100 to perform in an efficient manner, the ECU 102 may make predictions regarding use of the vehicle in certain situations and may control one or more of the engine 112, the battery 114, the motor-generator 116, and/or the transmission 118 based on the prediction. For example, the ECU 102 may predict that a driver of the vehicle 100 will request that the vehicle 100 be accelerated to 65 miles per hour (mph) while on a highway on-ramp. In that regard, the prediction may be triggered when the vehicle 100 is approaching an on-ramp. As the ECU 102 determines that the vehicle 100 is approaching the on-ramp, the ECU 102 may control the power source to prepare for such acceleration. Such preparation may be performed in order to improve or enhance efficiency of the power source.

The engine 112 may have an optimal setting at which it may perform most efficiently. For example, the optimal setting may include an optimal engine speed and an optimal torque. In that regard, when the ECU 102 predicts that the vehicle will accelerate to 65 mph, the ECU 102 may control the engine 112 to turn on and operate at the optimal engine speed and torque before the predicted acceleration begins. Such operation of the engine 112 may provide more power than necessary for the present operation, and the extra power may be used to charge the battery 114. Accordingly, when the acceleration begins, the engine 112 may continue to operate at the predetermined engine speed and torque and any additional power may be provided by the motor-generator 116 using energy stored in the battery 114. Because the engine 112 is continuously operating at the most efficient engine speed and torque, the total efficiency of the vehicle 100 is improved.

At times, this may be desirable to reduce the power load on at least one of the engine 112 and/or the motor-generator 116. For example, if the battery 114 does not include enough electrical energy to allow the vehicle 100 to perform a requested acceleration without running the engine 112 above the optimal engine speed and torque, it may be desirable for total power consumption of the vehicle 100 to be reduced. In that regard, the ECU 102 may decrease an amount of power used by the HVAC system 128 based on a predicted action of the vehicle 100.

Similarly, it may be desirable at times for total power consumption of the vehicle 100 to be increased. For example, during a deceleration, the motor-generator 116 may generate electrical power at a faster rate than the battery 114 can accept. In such a situation, it may be desirable to prevent waste of the extra power. In that regard, the ECU 102 may increase the amount of power used by the HVAC system 128 to reduce or prevent waste of the extra power based on a predicted acceleration or deceleration.

Thus, by predicting accelerations and decelerations of the vehicle 100 and controlling the power consumed by the HVAC system 128 based on the prediction, the ECU 102 may further increase efficiency of the vehicle 100.

Abrupt changes in noise and vibration of the vehicle 100 may be undesirable to drivers and passengers. In that regard, it may be undesirable to abruptly increase, decrease, or eliminate power provided to all components of the HVAC system 128 simultaneously. In that regard, the ECU 102 may separately control the amount of power provided to the compressor 132 and the fan 134.

In most conditions, the compressor 132 utilizes more power than the fan 134. In that regard, if the ECU 102 determines that it is desirable to reduce total power provided to the HVAC system 128, the ECU 102 may reduce the amount of power provided to the compressor 132 and increase the amount of power provided to the fan 134. When the power provided to the compressor 132 is decreased, the compressor 132 generates less noise and provides less cooling of the air. By increasing the power provided to the fan 134, the fan 134 generates more noise and circulates more air through the vehicle cabin. Thus, in this situation, total power consumption by the HVAC system 128 is reduced but the noise and vibration generated by the HVAC system 128 remain relatively constant.

Likewise, when the power provided to the compressor 132 is increased, the compressor 132 generates more noise and provides more cooling of the air. By simultaneously decreasing the power provided to the fan 134, the fan 134 generates less noise and circulates less air through the vehicle. Thus, in this situation, total power consumption by the HVAC system 128 is increased but the noise and vibration generated by the HVAC system 128 remain relatively constant.

Figure 2:
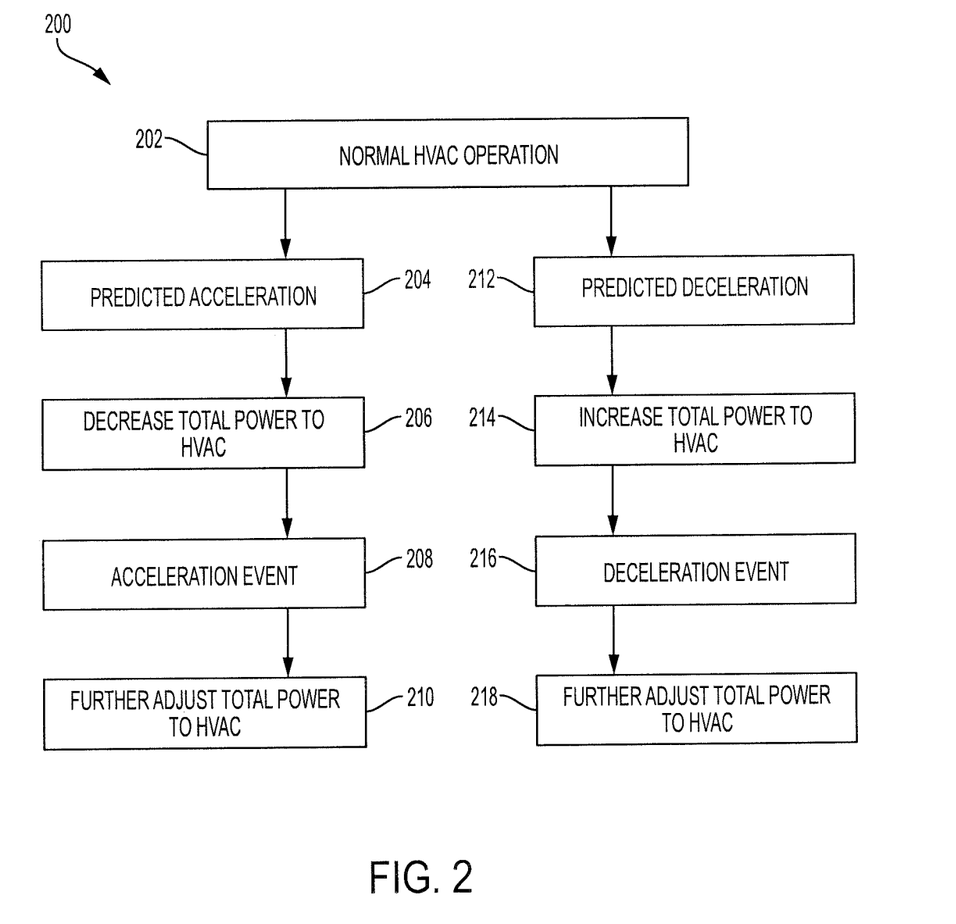
FIG. 2 is a flowchart illustrating a method for controlling an HVAC system of a vehicle based on a predicted acceleration or deceleration to increase efficiency of the vehicle according to an embodiment of the present invention.

Referring now to FIG. 2, a method 200 for controlling power provided to an HVAC system, such as the HVAC system 128 of FIG. 1, based on predicted accelerations and decelerations is shown. In block 202, the HVAC system may be operating in a conventional fashion. In that regard, the compressor may be compressing the refrigerant and the fan may be blowing the cool air into the vehicle cabin based on a desired temperature and fan speed as requested by a user via a control interface.

In block 204, the ECU may predict an upcoming acceleration of the vehicle. The acceleration may correspond to an increased power request of the power source. For example, the ECU predicts an upcoming acceleration when the vehicle is approaching an on-ramp or approaching a segment of a road in which a speed limit increases. The ECU may make this prediction based on various data such as location data detected by a GPS or an IMU, image data detected by a camera, vehicle speeds of nearby vehicles as detected by the radar or the LIDAR device, or as received via the network access device, or the like.

In block 206, the ECU may determine that it is desirable to decrease the total power provided to the HVAC system in order to conserve power in preparation of the predicted acceleration. The ECU may also determine a desirable amount to decrease the power provided to the HVAC system based on various information. For example, the ECU may determine how much to decrease the power provided to the HVAC system based on at least one of a predicted amount of power that will be used during the acceleration, a current temperature of the vehicle cabin, a current climate control setting (i.e., a requested temperature and/or fan speed), an engine temperature, an external temperature outside of the vehicle, an amount of light outside of the vehicle, or the location of the vehicle along a route.

In block 206, the ECU may decrease the total amount of power provided to the HVAC system. The ECU may decrease the total amount of power provided to the HVAC system based on the determination regarding how much to decrease the power. The ECU may decrease the total amount of power by controlling the compressor to receive less power. Simultaneously, the ECU may control the fan to receive more power in order to normalize the noise and volume generated by the HVAC system. In some embodiments, the ECU may instead cause the fan to receive the same amount of power as before the reduction of power provided to the compressor rather than increasing the amount of power provided to the fan.

In block 208, the actual acceleration event may occur. At this point, the ECU may compare the predicted acceleration to the actual acceleration to determine whether the predicted acceleration was less than, equal to, or greater than the actual acceleration. If the predicted acceleration is less than or greater than the actual acceleration then the ECU may determine an amount to increase or decrease the total amount of power provided to the HVAC system. For example, if the predicted acceleration is less than the actual acceleration than the ECU may determine that the amount of power provided to the HVAC system may be increased.

In block 210, the ECU may control the transfer of power to the HVAC system to provide the adjusted amount of power to the HVAC system.

In block 212, the ECU may predict an upcoming deceleration. The deceleration may be predicted in a similar manner as the acceleration is predicted in block 204. The ECU may further determine an amount to adjust power provided to the HVAC system in a similar manner as performed in block 204.

In block 214, the ECU may increase a total amount of power provided to the HVAC system. The ECU may do so by increasing an amount of power provided to the compressor and by decreasing an amount of power provided to the fan. In that regard, the HVAC system may receive more total power than prior to the adjustment and the total noise and vibration may remain relatively constant.

In block 216, the deceleration event may be detected by the ECU. The ECU may compare the predicted deceleration to the actual deceleration and determine whether the predicted deceleration was less than, equal to, or greater than the actual deceleration. If the predicted deceleration was less than or greater to the actual deceleration the ECU may determine an additional amount of power to be added or removed from the total power provided to the HVAC system. This may be performed in a similar manner as block 208.

In block 218, the ECU may further adjust the total power provided to the HVAC system based on the determined amount of power to be added or removed in block 216.

Figure 3A:
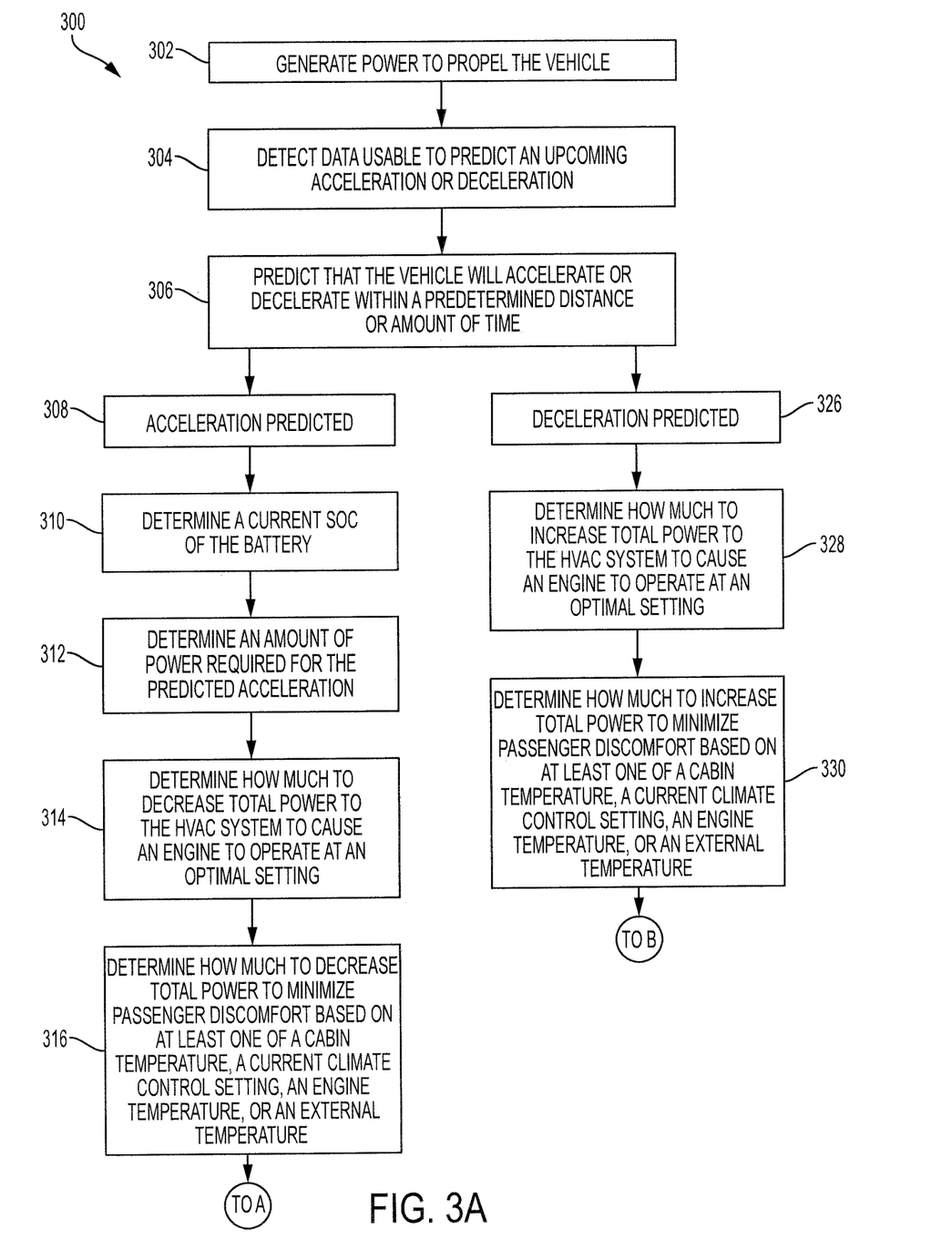
FIGS. 3A and 3B are flowcharts illustrating a method for controlling an HVAC system of a vehicle based on a predicted acceleration or deceleration to increase efficiency of the vehicle according to an embodiment of the present invention.
Figure 3B:
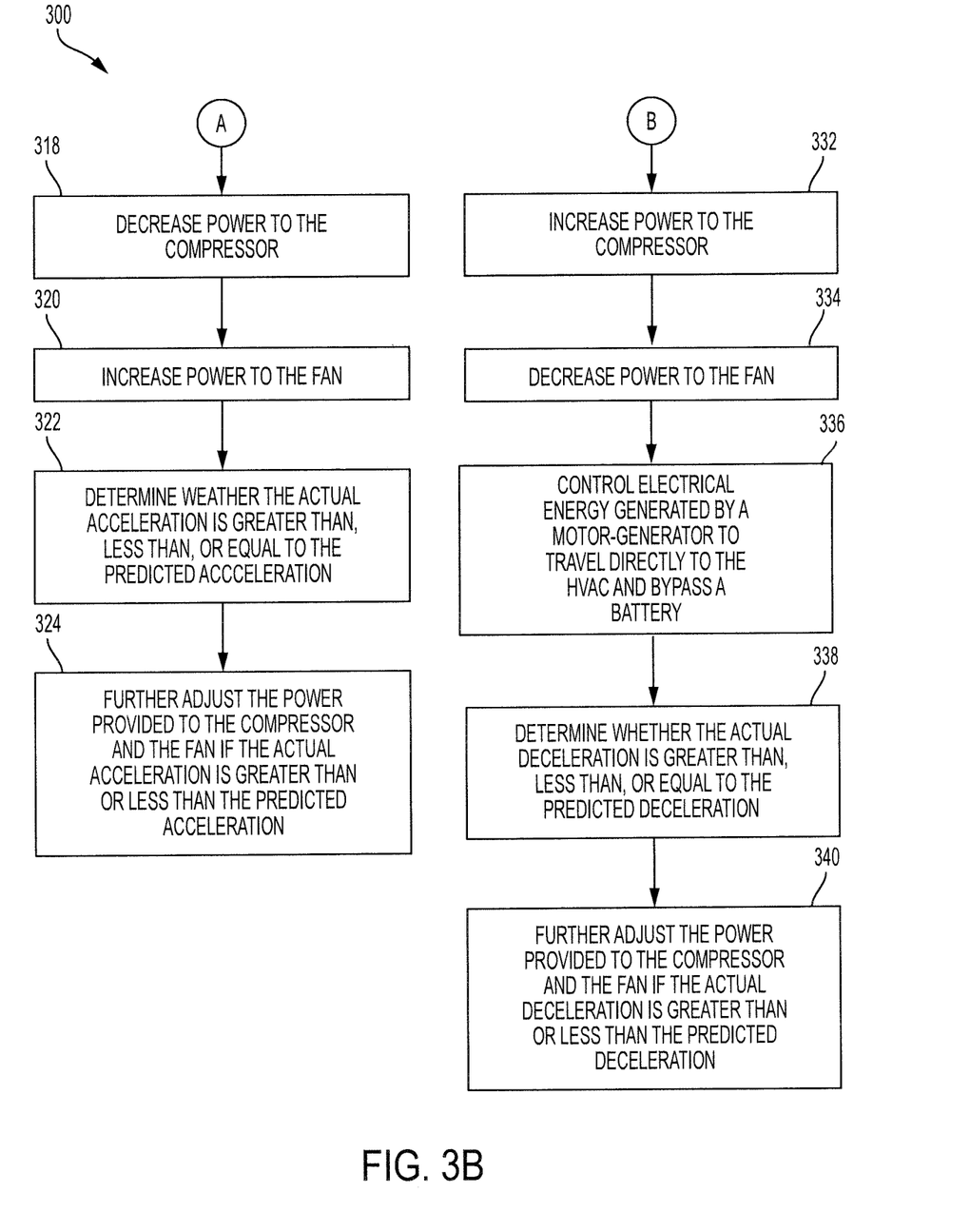

Referring now to FIGS. 3A and 3B, another method 300 for controlling operation of an HVAC system based on a predicted acceleration or a predicted deceleration is shown. In block 302, a power source of the vehicle may generate power to propel the vehicle. For example, the power source may include a combination of a battery and motor-generator, an engine, a fuel cell, or a hybrid including any combination of the above. The power generated by the power source may also be used to power electronic components of the vehicle, such as an HVAC system. For example, electrical energy stored in the battery or generated by the motor-generator may be transmitted to the electronic components via a bus. Similarly, mechanical power generated by the engine may be converted by the motor-generator or an alternator into electrical energy usable to power the electronic components.

In block 304, various sensors of the vehicle may detect data that is usable to predict an upcoming acceleration or deceleration of the vehicle. For example, the sensors may include a GPS sensor or an IMU sensor, a camera, a radar detector, a LIDAR detector, or a network access device capable of receiving, data corresponding to traffic conditions.

In block 306, the ECU may analyze the data detected in block 304 to predict whether the vehicle will accelerate or decelerate within a predetermined distance or a predetermined amount of time. The predetermined distance or the predetermined amount of time may correspond to a sufficient distance or amount of time for the power source to be prepared to most efficiently handle the acceleration or deceleration. For example, the predetermined distance may be 100 feet, 500 feet, a quarter of a mile, a half of a mile, or the like. The predetermined time of may be 5 seconds, 10 seconds, 30 seconds, 1 minute, 5 minutes, or the like.

The location data detected by the GPS or the IMU may be compared to a map and other stored data corresponding to previous actions by the driver. If the driver has previously accelerated at a certain location, the ECU may predict that the vehicle will accelerate in a similar manner when the vehicle reaches the certain location.

The camera, the radar detector, and the LIDAR detector may be used to detect data regarding other vehicles on the road such as speed of the other vehicles, congestion on the road, whether nearby vehicles have stopped, or the like. For example, if one of the sensors detects that other vehicles are accelerating, the ECU may predict that the current vehicle will accelerate. Likewise, if one of the sensors detects that traffic is increasing, the ECU may predict that the current vehicle will decelerate. Similarly, if one of the sensors detects that other vehicles have stopped, the ECU may predict that the current vehicle will stop.

The network access device may receive similar information such as traffic congestion, speeds of nearby vehicles, or the like. The ECU may similarly use this information to predict whether the vehicle will accelerate or decelerate.

The ECU may further predict an upcoming acceleration or deceleration based on road information such as a change in speed limit, an upcoming hill, or the like. This information may be detected by any of the vehicle sensors, may be stored in the memory of the vehicle, may be received via the network access device, or the like. For example, a map stored in the memory may indicate that the speed limit within a certain distance of the vehicle based on the change of the speed limit, the ECU may predict that the vehicle will accelerate or decelerate. Where used herein, an increase in power output to cause a vehicle to remain at a speed while traveling uphill may be considered to be an acceleration of the vehicle.

In block 308, the ECU may predict that an acceleration of the vehicle will occur within the predetermined distance or the predetermined amount of time. In block 310, if the vehicle power source includes a battery and a motor-generator, the ECU may determine a current state of charge (SOC) of the battery. The SOC corresponds to a remaining amount of electrical energy that may be used by the motor-generator power the vehicle.

In block 312, the ECU may determine or predict an amount of power that will be required for the predicted acceleration of the vehicle. This determination or prediction may be based on previously detected data and/or other information received by the ECU. For example, if previous accelerations at a certain location have required 5 Kilowatt-hours (kWh) of power then the ECU may predict that upcoming acceleration of will likewise require about 5 kWh of power. Similarly, the ECU may receive or retrieve information corresponding to the environment such as whether the vehicle is approaching a hill. For example, the ECU may predict an amount of power that will be required to accelerate the vehicle up an upcoming hill based on the length of the hill, the grade of the hill, or the like.

In block 314, the ECU may determine an amount to decrease the total power provided to the HVAC system. In some embodiments, the ECU may determine how much to decrease the total power in order to allow the engine to operate at an optimal engine speed and torque. The determination made in block 314 may be based on optimal fuel efficiency of the vehicle.

In some embodiments and in block 316, the ECU may determine how much to decrease the total power provided to the HVAC system based on additional or other information such as the total power required for the acceleration of the vehicle, a current temperature of the vehicle cabin, a current climate control setting, an engine temperature, an external temperature, an amount of light outside of the vehicle, or a location along a route.

The predicted amount of power used during the acceleration may affect the amount to decrease the power of the HVAC system because any power savings from the HVAC system may be applied to provide power for the acceleration. Thus, it may be desirable to provide less power to the HVAC system when the predicted power use is great relative to when the predicted power use is relatively small such that the extra power savings can be used to power the vehicle through the acceleration.

The current temperature of the vehicle cabin may affect the amount to decrease the power of the HVAC system because if the vehicle cabin temperature is relatively close to a desired temperature then more power may be reserved than if the vehicle cabin temperature is already higher than the current cabin temperature. Thus, it may be desirable or acceptable to provide more power to the HVAC system if the current cabin temperature is already higher than the desired cabin temperature relative to when the current cabin temperature is equal to or less than the desired cabin temperature. Likewise, it may be desirable or acceptable to provide less power to the HVAC system if the current cabin temperature is less than the desired cabin temperature.

The current climate control setting may affect the amount to decrease the power of the HVAC system in a similar manner as the current temperature of the vehicle cabin. For example, if the current climate control setting is cooler than a current temperature of the vehicle cabin then it may be desirable or acceptable to provide more power to the HVAC system relative to when the current temperature is equal to the current climate control setting.

The engine temperature may affect the amount to decrease the power of the HVAC system because heat from the engine may transfer into the vehicle cabin. In that regard, if the engine temperature is relatively high, it may be desirable to provide more power to the HVAC system relative to when the engine temperature is relatively low in order to reduce the effect of heat transferred from the engine to the vehicle cabin.

The ambient temperature may affect the amount to decrease the power of the HVAC system in a similar manner as the engine temperature because heat from outside of the vehicle may transfer into the vehicle cabin. In that regard, if the ambient temperature is relatively high, it may be desirable to provide more power to the HVAC system relative to when the ambient temperature is relatively low in order to reduce the effect of heat transferred into the vehicle cabin.

The ambient amount of light may affect the amount to decrease the power of the HVAC system in a similar manner as the ambient temperature because a relatively large amount of light indicates that the sun is shining and may heat the cabin relatively quickly. In that regard, if the ambient amount of light is relatively high, it may be desirable to provide more power to the HVAC system relative to when the ambient amount of light is relatively low in order to reduce the effect of heat transferred into the vehicle cabin.

The location of the vehicle along a route may affect the amount to decrease the power of the HVAC system as it may be less important that the cabin temperature increases if the vehicle is nearing an end of the route. In that regard, if the vehicle is relatively close to the end of a route, it may be acceptable to further reduce the amount of power provided to the HVAC system relative to when the vehicle is not relatively close to the end of a route.

In some embodiments, the ECU may determine how much to decrease the amount of power provided to the HVAC system based on block 314 alone, block 316 alone, or a combination of blocks 314 and 316. When the latter embodiment is utilized, the ECU may balance the factors of blocks 314 and 316 when determining the total reduction of power provided to the HVAC system. The weight provided to each factor may be determined based on prior driver behavior, may be programmed into the ECU, or may be selected by the driver. For example, the driver may select an ECO mode in which the power reduction is increased (i.e., less power is provided to the HVAC system), may select a comfort mode in which the power reduction is decreased (i.e., more power is provided to the HVAC system relative to the ECO mode), or the like.

In block 318 the ECU may decrease the amount of power provided to the compressor and, in block 320, may increase the amount of power provided to the fan. The decreased amount of power provided to the compressor may be determined based on the results of blocks 314 and 316 above. The amount of power provided to the fan may likewise be determined based on the results of blocks 314 and 316 above. The amount of power provided to the fan may also be determined based on a desire to reduce variation in noise and vibration generated by the HVAC system.

In block 322, the ECU may determine whether the actual acceleration is greater than, less than, or equal to the predicted acceleration. For example, the ECU may compare an amount of power requested by the driver to the predicted power use to determine whether the prediction was accurate or not. The ECU may also or instead compare actual acceleration rates to the predicted acceleration rates to determine whether the prediction was accurate or not.

In block 324, if the actual acceleration was greater than or less than the predicted acceleration, the ECU may further adjust the amount of power provided to the compressor and the fan. For example, if the actual acceleration is greater than the predicted acceleration, the ECU may reduce a total amount of power provided to the HVAC system by decreasing the amount of power provided to the compressor and increasing the amount of power provided to the fan.

In block 326 the ECU may predict that a deceleration will occur within the predetermined distance or the predetermined amount of time. In block 328, the ECU may determine how much to increase the total power provided to the HVAC system. In some embodiments, the ECU may determine how much to increase the total power provided to the HVAC system in order to cause an engine to operate at the optimal engine speed and torque. In some embodiments, the ECU may determine how much to increase the total power based on a rate of electrical energy generated by the motor-generator and a maximum rate of electrical energy which the battery may receive. For example, if the motor-generator generates 3 kW of electrical power and the battery can only receive 2 kW of electrical power then the ECU may determine that the HVAC system should receive an additional 1 kW of electrical power.

In block 330, the ECU may determine how much to increase the total power provided to the HVAC system in order to minimize passenger discomfort. For example, the ECU may make this determination based on at least one of a cabin temperature, a current climate control setting, an engine temperature, an external temperature, an ambient amount of light, a location of the vehicle along a route, or the like. In some embodiments, the ECU may also make this determination based on whether an acceleration of the vehicle is predicted to occur after a deceleration of the vehicle. For example, if the vehicle is predicted to accelerate after the deceleration then it may be desirable to provide more power to the HVAC system in order to cool the vehicle cabin in preparation of the reduced cooling during the acceleration.

In some embodiments, the ECU may determine how much to increase the total power based on block 328 alone, block 330 alone, or a combination of blocks 328 and 330. In the latter embodiment, the ECU may balance the factors of blocks 328 and 330 and may make the determination based on the balancing.

In block 332 the ECU may increase the amount of power provided to the compressor, and in block 334 the ECU may decrease the amount of power provided to the fan. Such adjustments may increase a total amount of power provided to the HVAC system while resulting in relatively little variation in noise and vibration generated by the HVAC system.

In block 336, the ECU may control the electrical energy generated by the motor-generator to bypass the battery and travel directly to the HVAC system. For example and with brief reference to FIG. 1, the ECU may cause the electrical energy generated by the motor-generator 116 to travel along the bus 113 directly to the HVAC system 128. Such bypassing of the battery may result in reduced power loss by the vehicle. As power travels along the bus 113, some of the power may dissipate as heat. By bypassing the portion of the bus 113 that is connected to the battery 114, power loss along that portion of the bus 113 is eliminated. Furthermore, the power may be provided to the HVAC system 128 more quickly relative to when it must first be received by the battery 114 then transferred to the HVAC system 128. Additionally, the lifespan and durability of the battery 114 may be increased by reducing the power throughput of the battery 114. By causing some of the power to bypass the battery 114, the throughput of the battery 114 is reduced, thus increasing the lifespan and durability of the battery 114.

In some embodiments, the battery 114 may only be capable of receiving electrical power at a certain rate. By bypassing the battery 114 with some power that is provided directly to the HVAC system 128, the remaining power may be provided to the battery 114 at an acceptable rate. This is because a portion of the power is transferred to the HVAC system 128 without increasing the rate of power transfer to the battery 114. By preventing the rate of power to the battery 114 from reaching or exceeding a power rate limit, the lifespan of the battery 114 may be increased.

In block 338, the ECU may determine whether the actual deceleration is greater than, less than, or equal to the predicted deceleration. This may be performed in a similar manner as performed in block 322 as described above.

In block 340, the ECU may further adjust the power that is provided to the HVAC system if the actual deceleration is greater than or less than the predicted deceleration. For example, if the actual deceleration is greater than the predicted deceleration then the ECU may increase the amount of power that is provided to the HVAC system.

Figure 4:
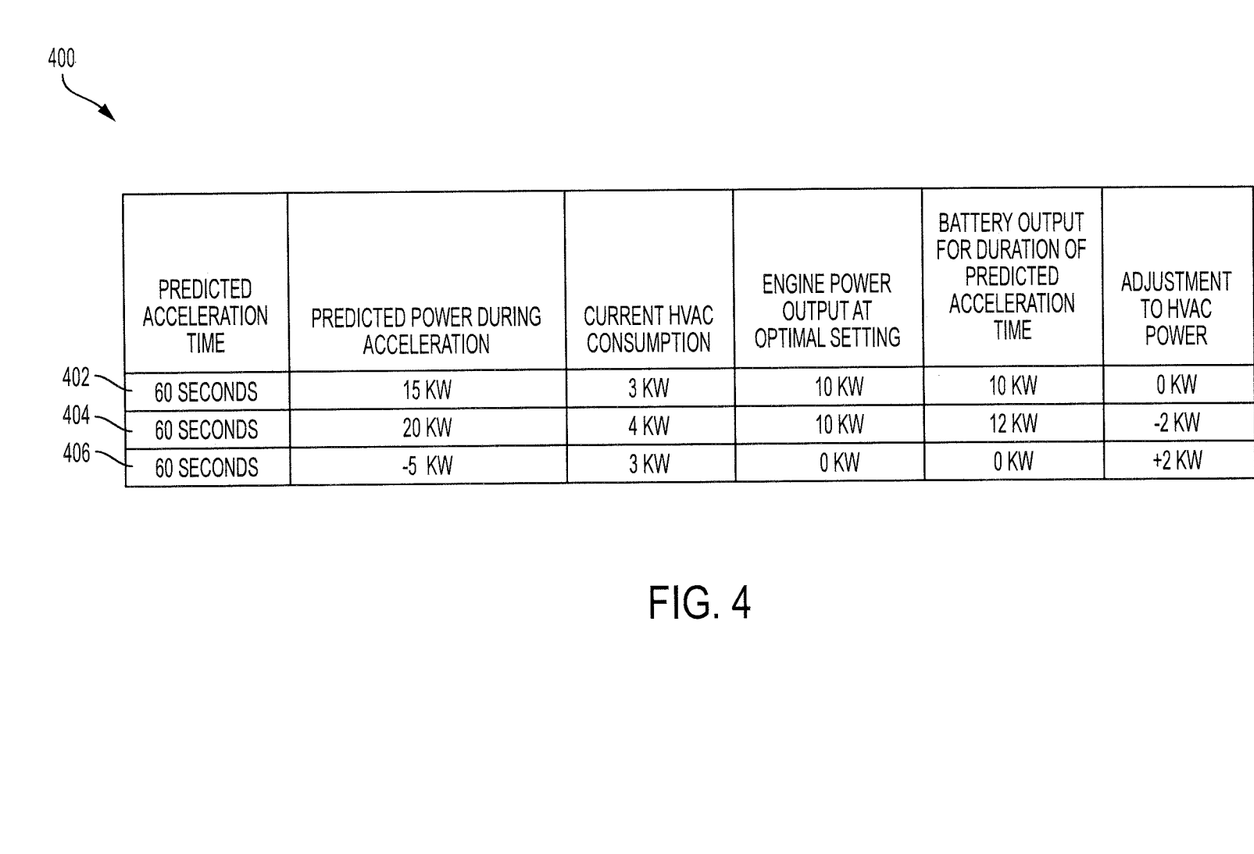
FIG. 4 is a chart illustrating exemplary uses of the method of FIGS. 3A and 3B according to an embodiment of the present invention.

Referring now to FIG. 4, a chart 400 illustrates exemplary situations and adjustments of an amount of power provided to an HVAC system. In a first line 402 corresponding to a first example, the ECU may predict that an acceleration of the vehicle will occur, will require 15 kW of power, and will last for 60 seconds. Current power consumption by the HVAC system may be 3 kW. An engine of the vehicle may generate 10 kW of power when operating at the optimal engine speed and torque. The battery of the vehicle may have a sufficient SOC to provide 10 kW of power during the 60 seconds of acceleration.

In that regard, the predicted power consumption during the acceleration is equal to 18 kW (the 15 kW of power to propel the vehicle and the current 3 kW of HVAC consumption). The total power that may be efficiently provided by the power source during the acceleration is equal to 20 kW (the 10 kW of power provided by the engine at the optimal setting and the 10 kW that may be provided by the battery during the acceleration). Thus, no adjustment to the HVAC power consumption may be made because the power source may provide more power than is necessary to keep the HVAC operating at the current setting while the engine is operating at the optimal setting.

In a second line 404 corresponding to a second example, the ECU may predict that an acceleration of the vehicle will occur, will require 20 kW of power, and will last for 60 seconds. The current power consumption by the HVAC system may be 4 kilowatts. An engine of the vehicle may still generate 10 kW of power when operating at the optimal engine speed and torque. The battery of the vehicle may have a sufficient SOC to provide 12 kW of power during the 60 seconds of acceleration.

In that regard, the predicted power consumption during the acceleration is equal to 24 kW (the 20 kW of power to propel the vehicle and the current for kilowatts of HVAC consumption). The total power that may be efficiently provided by the power source during the acceleration is equal to 22 kW (the 10 kW of power provided by the engine at the optimal setting and the 12 kW that may be provided by the battery during the acceleration).

In this example, the predicted power consumption is greater than power that may be provided during the acceleration while allowing the engine to operate at the optimal setting. In that regard, it may be desirable to reduce the amount of power provided to the HVAC system. By reducing the amount of power provided to the HVAC systems by 2 kW, the amount of power that is predicted to be consumed during the acceleration may be equal to the amount of power provided by the power source while allowing the engine to operate at the optimal setting.

In some embodiments, it may be desirable to reduce the amount of power provided to the HVAC system by a greater amount to provide a buffer. This may be done in order to increase the likelihood that state of charge of the battery is sufficient to allow the acceleration to be completed without causing the engine to operate at an engine speed or torque that is greater than the optimal setting. In that regard, it may be desirable to reduce the amount of power provided to the HVAC system by 3 kW.

In a third line 406, the ECU may predict that a deceleration will occur, that the motor-generator will generate 5 kW of power during the deceleration, and the deceleration will last for 60 seconds. Current power consumption by the HVAC system may be 3 kW. The engine of the vehicle may still generate 10 kW of power when operating at the optimal engine speed and torque. Because power is not required to propel the vehicle during the deceleration, the SOC of the battery may be taken out of the consideration. In some embodiments, the SOC of the battery may be considered as it may be desirable to provide some of the extra power to the battery rather than the HVAC system.

In that regard, the predicted power consumption during the deceleration is equal to 3 kW (the 3 kW of HVAC consumption). The total power generated during the deceleration may be 5 kW (the 5 kW generated by the motor-generator). Thus, it may be desirable to increase the amount of power provided to the HVAC system by 2 kW such that all power generated by the motor-generator during the deceleration is utilized.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adjusting a vehicle climate control based on a predicted action of a vehicle, the system comprising:
    a power source configured to generate power to propel the vehicle;
    a sensor configured to detect data that is usable to predict an upcoming acceleration or deceleration of the vehicle;
    a heating, ventilation, and air conditioning (HVAC) system having a compressor configured to compress vapor refrigerant and a fan configured to blow conditioned air into a cabin of the vehicle, the compressor and the fan both configured to operate using a portion of the power generated by the power source; and
    an electronic control unit (ECU) coupled to the power source, the sensor, and the HVAC system and configured to:
        predict that the vehicle will accelerate within a predetermined distance or a predetermined amount of time based on the data detected by the sensor,
        determine a decreased compressor amount of power to be provided to the compressor and an increased fan amount of power to be provided to the fan in response to predicting that the vehicle will accelerate within the predetermined distance or the predetermined amount of time, the decreased compressor amount of power and the increased fan amount of power being determined to reduce total power provided to the HVAC system in a manner that minimizes variance in total noise and vibration generated by the HVAC system, and
        decrease the power that is provided to the compressor by the decreased compressor amount of power and increase the power that is provided to the fan by the increased fan amount of power in response to predicting that the vehicle will accelerate within the predetermined distance or the predetermined amount of time.

2. The system of claim 1 wherein the ECU is further configured to:
predict that the vehicle will decelerate within the predetermined distance or the predetermined amount of time based on the data detected by the sensor;
determine an increased compressor amount of power to be provided to the compressor and a decreased fan amount of power to be provided to the fan in order to increase total power provided to the HVAC system and to reduce variance in total noise and vibration generated by the HVAC system in response to predicting that the vehicle will decelerate within the predetermined distance or the predetermined amount of time; and
increase the power that is provided to the compressor by the increased compressor amount of power and decrease the power that is provided to the fan by the decreased fan amount of power in response to predicting that the vehicle will decelerate within the predetermined distance or the predetermined amount of time.

3. The system of claim 1 wherein:
the power source includes a battery configured to store electrical energy and having a state of charge (SOC), a motor-generator configured to convert the electrical energy into the power, and an engine configured to convert fuel into the power; and
the ECU is further configured to:
determine a current SOC of the battery and an amount of power required for the predicted acceleration,
determine an insufficient SOC condition based on the current SOC of the battery being insufficient to provide the amount of power required for the predicted acceleration without starting the engine, and
decrease the power that is provided to the compressor and increase the power that is provided to the fan only in response to determining the insufficient SOC condition.

4. The system of claim 1 wherein the power source includes an engine configured to convert fuel into the power and having an optimal setting corresponding to an optimal torque and an optimal engine speed that provide an optimal engine efficiency, and wherein the ECU is further configured to decrease the total power that is provided to the HVAC system in order to cause the engine to operate at a torque and an engine speed that are closer to the optimal setting than a current setting based on the predicted acceleration.

5. The system of claim 1 wherein:
the power source includes a battery configured to store electrical energy and having a state of charge (SOC), a motor-generator configured to convert the electrical energy into the power and to convert mechanical power into the electrical energy, and a power bus coupled to the battery, the motor-generator, and the HVAC system and configured to transfer the electrical energy; and
the ECU is further configured to cause at least some of the electrical energy generated by the motor-generator to bypass the battery such that the at least some of the electrical energy travels directly from the motor-generator to the HVAC system in response to the motor-generator converting the mechanical power into the electrical energy in order to reduce power loss.

6. The system of claim 1 wherein the ECU is further configured to determine how much to decrease the total power that is provided to the HVAC system based on a current temperature of a vehicle cabin, a current climate control setting, an engine temperature, or an external temperature.

7. The system of claim 1 wherein the ECU is further configured to determine that an actual acceleration is greater than or less than the predicted acceleration and to adjust the total power that is provided to the HVAC system in response to determining that the actual acceleration is greater than or less than the predicted acceleration.

8. A system for adjusting a vehicle climate control based on a predicted action of a vehicle, the system comprising:
a power source configured to generate power to propel the vehicle;
a sensor configured to detect data that is usable to predict an upcoming acceleration or deceleration of the vehicle;
a heating, ventilation, and air conditioning (HVAC) system having a compressor configured to compress vapor refrigerant and a fan configured to blow conditioned air into a cabin of the vehicle, the compressor and the fan both configured to operate using a portion of the power generated by the power source; and
an electronic control unit (ECU) coupled to the power source, the sensor, and the HVAC system and configured to:
predict that the vehicle will decelerate within a predetermined distance or a predetermined amount of time based on the data detected by the sensor,
determine an increased compressor amount of power to be provided to the compressor and a decreased fan amount of power to be provided to the fan in response to predicting that the vehicle will decelerate within the predetermined distance or the predetermined amount of time, the increased compressor amount of power and the decreased fan amount of power being determined to increase total power provided to the HVAC system in a manner that minimizes variance in total noise and vibration generated by the HVAC system, and
increase the power that is provided to the compressor by the increased compressor amount of power and decrease the power that is provided to the fan by the decreased fan amount of power in response to predicting that the vehicle will decelerate within the predetermined distance or the predetermined amount of time.

9. The system of claim 8 wherein the ECU is further configured to:
predict that the vehicle will accelerate within the predetermined distance or the predetermined amount of time;
determine a decreased compressor amount of power to be provided to the compressor and an increased fan amount of power to be provided to the fan in order to reduce total power provided to the HVAC system and to reduce variance in total noise and vibration generated by the HVAC system in response to predicting that the vehicle will accelerate within the predetermined distance or the predetermined amount of time, and
decrease the power that is provided to the compressor by the decreased compressor amount of power and increase the power that is provided to the fan by the increased amount of power in response to predicting that the vehicle will accelerate within the predetermined distance or the predetermined amount of time.

10. The system of claim 8 wherein:
the power source includes a battery configured to store electrical energy and having a state of charge (SOC), a motor-generator configured to convert the electrical energy into the power, and an engine configured to convert fuel into the power; and the ECU is further configured to:
predict that the vehicle will accelerate based on the data detected by the sensor,
determine a current SOC of the battery and an amount of power required for the predicted acceleration,
determine an insufficient SOC condition based on the current SOC of the battery being insufficient to provide the amount of power required for the predicted acceleration without starting the engine, and
decrease the power that is provided to the compressor and to increase the power that is provided to the fan only in response to determining the insufficient SOC condition.

11. The system of claim 8 wherein the power source includes an engine configured to convert fuel into the power and having an optimal setting corresponding to an optimal torque and an optimal engine speed that provide an optimal engine efficiency, and wherein the ECU is further configured to increase the total power that is provided to the HVAC system in order to cause the engine to operate at a torque and an engine speed that are closer to the optimal setting than a current setting based on the predicted acceleration or deceleration.

12. The system of claim 8 wherein:
the power source includes a battery configured to store electrical energy and having a state of charge (SOC), a motor-generator configured to convert the electrical energy into the power and to convert mechanical power into the electrical energy, and a power bus coupled to the battery, the motor-generator, and the HVAC system and configured to transfer the electrical energy; and
the ECU is further configured to cause at least some of the electrical energy generated by the motor-generator to bypass the battery such that the at least some of the electrical energy travels directly from the motor-generator to the HVAC system in response to the motor-generator converting the mechanical power into the electrical energy in order to reduce power loss.

13. The system of claim 8 wherein the ECU is further configured to determine how much to increase the power that is provided to the HVAC system based on a current temperature of a vehicle cabin, a current climate control setting, an engine temperature, or an external temperature.

14. The system of claim 8 wherein the ECU is further configured to determine that an actual deceleration is greater than or less than the predicted deceleration and to adjust the total power that is provided to the HVAC system in response to the actual deceleration being greater than or less than the predicted deceleration.

15. A method for adjusting a vehicle climate control based on a predicted action of a vehicle, the method comprising:
generating, by a power source, power to propel the vehicle;
detecting, by a sensor, data that is usable to predict an upcoming acceleration or deceleration of the vehicle;
predicting, by an electronic control unit (ECU), that the vehicle will accelerate within a predetermined distance or a predetermined amount of time based on the data detected by the sensor;
determining, by the ECU, a decreased compressor amount of power to be provided to a compressor and an increased fan amount of power to be provided to the fan in response to predicting that the vehicle will accelerate within the predetermined distance or the predetermined amount of time, the decreased compressor amount of power and the increased fan amount of power being determined to reduce total power of a heating, ventilation, and air conditioning (HVAC) system in a manner that minimizes total variance in noise and vibration generated by the HVAC system; and
decreasing, by the ECU, the power that is provided to a compressor by the decreased compressor amount of power and increasing, by the ECU, the power that is provided to a fan of the HVAC system by the increased fan amount of power in response to predicting that the vehicle will accelerate within the predetermined distance or the predetermined amount of time.

16. The method of claim 15 further comprising:
determining, by the ECU, a current state of charge (SOC) of a battery of the power source;
determining, by the ECU, an amount of power required for the predicted acceleration;
determining, by the ECU, an insufficient SOC condition based on the current SOC of the battery being insufficient to provide the amount of power required for the predicted acceleration without starting the engine; and
decreasing, by the ECU, the power that is provided to the compressor and increasing, by the ECU, the power that is provided to the fan only in response to determining the insufficient SOC condition.

17. The method of claim 15 further comprising decreasing the total power that is provided to the HVAC system to cause an engine of the power source to operate at a torque and an engine speed that are closer to an optimal setting of the engine than a current setting of the engine based on the predicted acceleration, the optimal setting corresponding to an optimal torque and an optimal engine speed that provide an optimal engine efficiency.

18. The method of claim 15 further comprising:
converting, by a motor-generator, mechanical power into electrical energy; and
causing, by the ECU, at least some of the electrical energy generated by the motor-generator to bypass a battery such that the at least some of the electrical energy travels directly from the motor-generator to the HVAC system in response to the motor-generator converting the mechanical power into the electrical energy in order to reduce power loss by a power bus of the power source.

19. The method of claim 15 further comprising determining, by the ECU, how much to decrease the total power that is provided to the HVAC system based on a current temperature of a vehicle cabin, a current climate control setting, an engine temperature, or an external temperature.

20. The method of claim 15 further comprising:
determining, by the ECU, that an actual acceleration is greater than or less than the predicted acceleration; and
adjusting, by the ECU, the total power that is provided to the HVAC system in response to the actual acceleration being greater than or less than the predicted acceleration.

* * * * *